(12) United States Patent
Moser et al.

(10) Patent No.: US 11,619,273 B1
(45) Date of Patent: Apr. 4, 2023

(54) VISCOUS COUPLING

(71) Applicant: BorgWarner Inc., Auburn Hills, MI (US)

(72) Inventors: Tobias Moser, Ludwigsburg (DE); Frank Gerber, Ludwigsburg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/814,079

(22) Filed: Jul. 21, 2022

(51) Int. Cl.
  *F16D 35/02* (2006.01)
  *F04D 25/02* (2006.01)
  *F04D 19/00* (2006.01)

(52) U.S. Cl.
  CPC ......... *F16D 35/024* (2013.01); *F04D 19/002* (2013.01); *F04D 25/022* (2013.01); *F16D 35/021* (2013.01); *F16D 35/027* (2013.01)

(58) Field of Classification Search
  CPC .......................................... F16D 35/02–35/027
  USPC ........................................................ 192/58.7
  See application file for complete search history.

(56) References Cited

U.S. PATENT DOCUMENTS

| | | | | |
|---|---|---|---|---|
| 3,403,764 | A * | 10/1968 | Sutaruk | F16D 35/025 192/58.6 |
| 4,564,094 | A * | 1/1986 | Storz | F16D 35/022 192/82 T |
| 7,650,974 | B2 * | 1/2010 | Light | F16D 35/024 192/58.61 |
| 10,563,708 | B2 | 2/2020 | Stagg et al. | |

* cited by examiner

*Primary Examiner* — Richard M Lorence
(74) *Attorney, Agent, or Firm* — Bose McKinney & Evans LLP

(57) ABSTRACT

Disclosed is a viscous coupling that has a housing that carries ribs that are arranged concentrically about a central axis. A rotor is provided that can rotate relative to the housing about the central axis in a predetermined direction. The rotor also carries ribs, and the ribs of the housing and the rotor are arranged in a working chamber surrounded by the housing. Also provided is a fluid reservoir. A fluid discharge line leads from the working chamber to the fluid reservoir. A wiper is moveably arranged between the housing and the rotor and scrapes fluid from the rotor and feeds it to the fluid discharge line. A stop is provided for the wiper and is arranged next to the rotor.

12 Claims, 5 Drawing Sheets

VISCOUS COUPLING

BACKGROUND

This disclosure originates from a viscous coupling of the type generally known from U.S. Pat. No. 10,563,708 B2.

Such a viscous coupling has a wiper, which, in operation, bears against a rotor arranged in a working chamber, so as to scrape off fluid and feed it to a fluid discharge line, which leads from the working chamber to a fluid reservoir. This wiper is subject to considerable wear and abrasion of material, which can lead to a failure of the wiper, and thus a failure of the viscous coupling.

SUMMARY

This disclosure teaches how a premature failure of the viscous coupling due to wear can be prevented.

A viscous coupling in accordance with this disclosure has a stop, which is arranged next to the rotor and which the wiper contacts, at least after a permissible amount of wear and abrasion of material has occurred, while it scrapes fluid from the rotor and feeds it to the fluid discharge line. The wiper projects axially beyond the rotor on at least one side, preferably on two opposite sides.

If material is abraded from the wiper in operation, this is usually unproblematic at first, until the wear reaches such an extent that the wiper fails, for example, in that it breaks apart. The stop for an inventive wiper therefore does not necessarily have to be arranged in such a way that, in the case of a brand-new viscous coupling, the wiper can bear against the latter from the onset. Instead, it is also possible for the wiper only to become effective when part of the wiper, or also part of the rotor, has been worn away due to wear. In this way, the wiper can initially, as with conventional viscous couplings, bear against the rotor and efficiently scrape off fluid from the rotor. Only when the wear has reached a problematic level, which makes an imminent failure of the wiper appear possible, does the stop come into play and prevent—at least from that point onwards—the wiper from continuing to bear against the (already partially abraded) rotor. If the wiper no longer bears against the rotor, it cannot scrape off fluid from the rotor as efficiently, but in the rather rare case of a heavily-used viscous coupling this is less important, if a failure can thereby be avoided.

In accordance with this disclosure, therefore, the risk of a failure due to wear can be substantially reduced in the case of unusually heavily used viscous couplings, without reducing the efficiency of the wiper in the case of less heavily used viscous couplings.

In an advantageous refinement of this disclosure, provision is made for two stops to be arranged on opposite sides of the rotor, against which opposing edges of the wiper can bear. In this way, tilting moments can be reduced, or even avoided completely, and thus a failure of the wiper due to wear can be avoided even more reliably.

The wiper of a brand-new viscous coupling, on its inner face facing towards the rotor, can have two radially inwardly protruding edge regions, so that the wiper can bear against the stops with these opposing edge regions, even before any removal of material due to wear occurs, and the inner face of the wiper has no contact with the rotor at all. However, it is also possible that the wiper of a brand-new viscous coupling can initially with its inner face bear against the rotor, and only with time, due to removal of material caused by wear, does the inner face of the wiper acquire a shape in which contact with the rotor is prevented by the stops.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
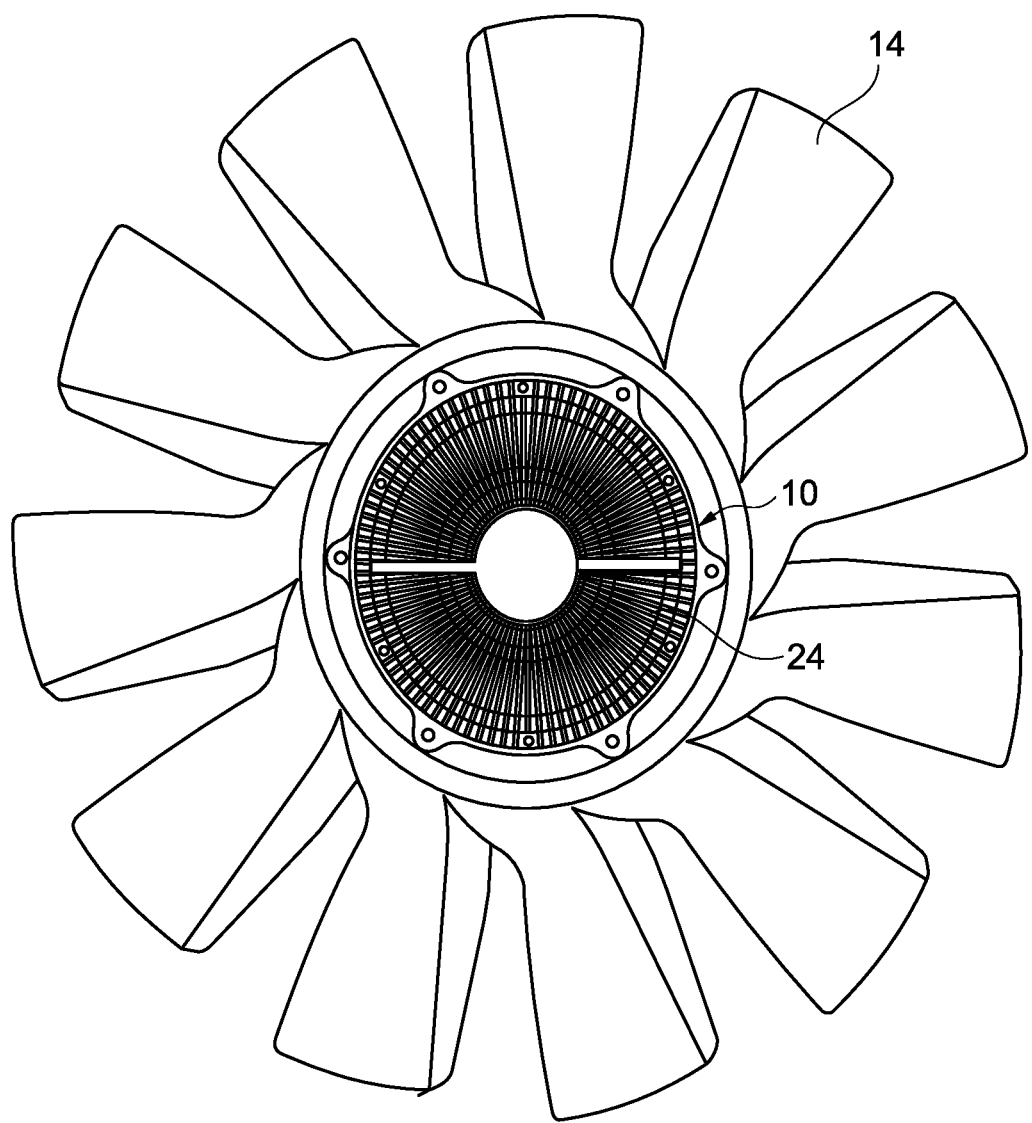
FIG. 1 shows an isometric frontal view of a viscous coupling, with an axial flow fan connected.
Figure 2:
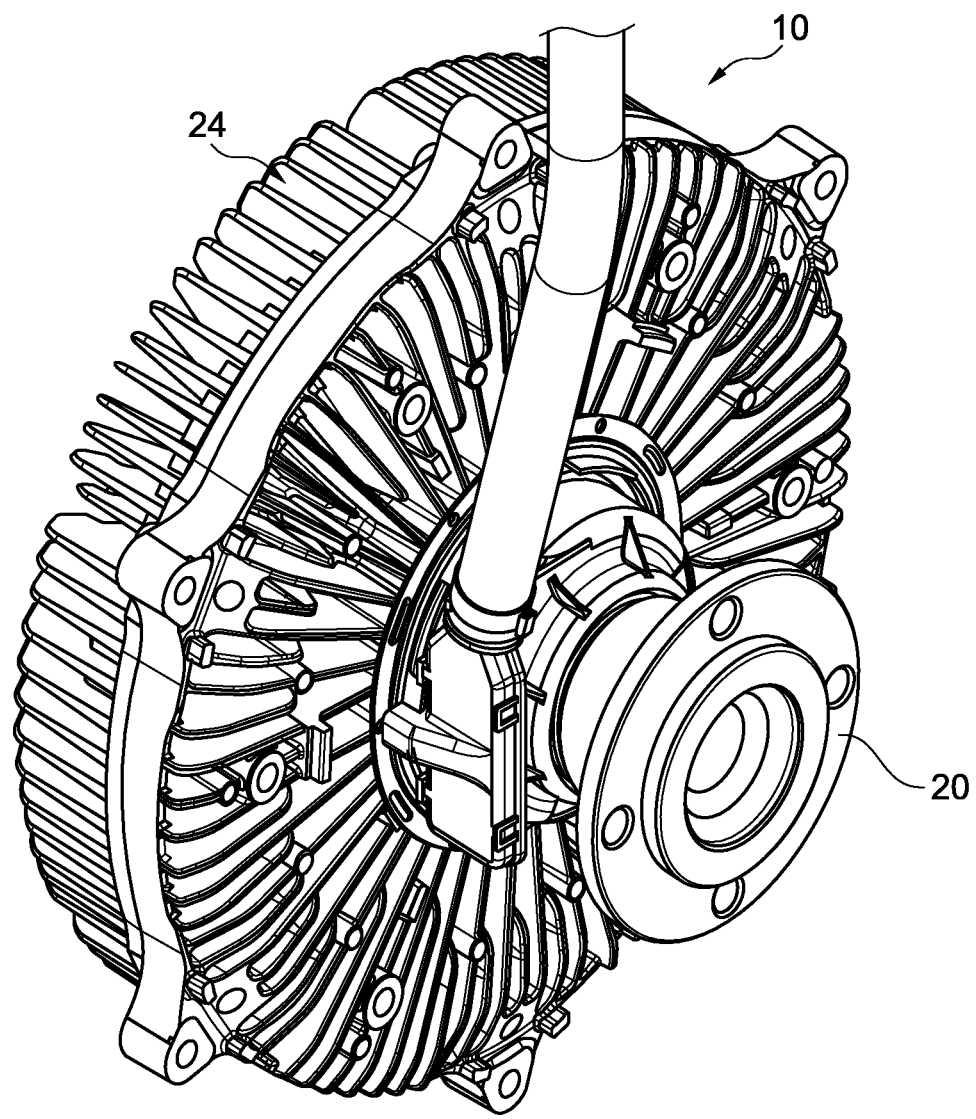
FIG. 2 shows a view in perspective of the rear side of the viscous coupling of FIG. 1.
Figure 3:
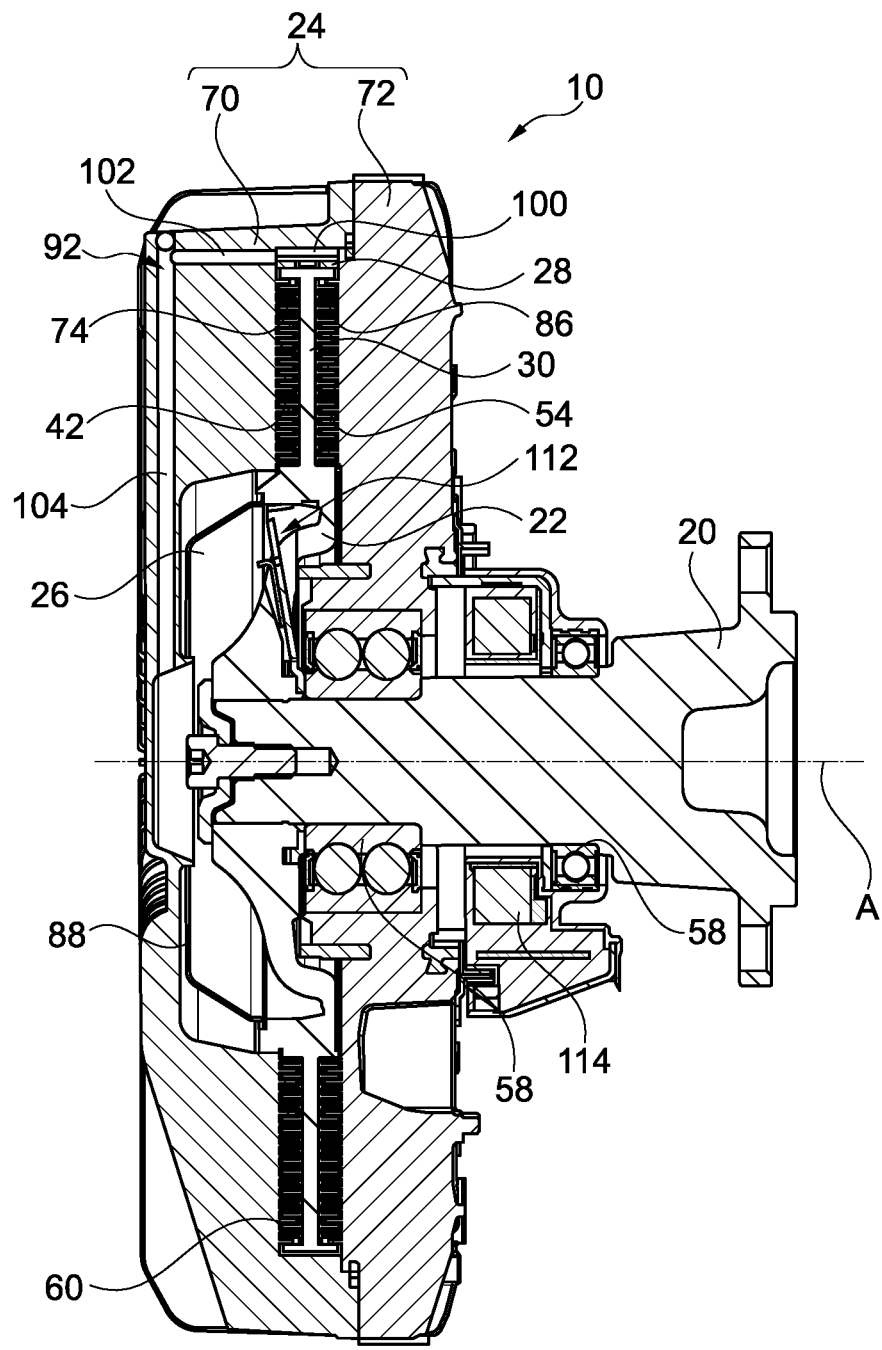
FIG. 3 shows a cross-sectional view of the viscous coupling of FIG. 1.

FIGS. 1, 2 and 3 illustrate a viscous coupling 10 connected to an axial flow fan 14. The viscous coupling 10 has a shaft 20, which drives a rotor 22 arranged in a housing 24. The rotor 22 is arranged in a working chamber 60 of the housing 24 and has ribs 42, 54 arranged concentrically with respect to a geometric central axis A of the shaft 20. When the working chamber, in operation, is filled with a fluid, such as oil, and the rotor 22 rotates, a torque is generated in this fluid as a result of friction with the ribs 42, 54. The fluid receives a torque in the working chamber by a shearing action, so to speak. This torque of the fluid causes the housing 24 to rotate about the geometric central axis A due to friction. To increase friction with the fluid, the housing 24 can have concentric grooves, ribs 74, 86, or annular walls, on both sides of the rotor 22, along which the fluid flows.

The viscosity of the fluid in the working chamber 60 thus transmits a rotational movement of the shaft 20 onto the housing 24, which thus forms the power take-off part of a coupling. The housing 24 consists of a plurality of housing parts 70, 72, which can be rotated relative to the shaft 20 via one or a plurality of bearings 58.

If the working chamber 60 is filled with fluid, the viscous coupling is therefore active, that is to say, the shaft 20, as the driving part of the coupling, is coupled to the housing 24, that is to say, the power take-off. In order to decouple the shaft 20 and the housing 24, the working chamber is emptied by transferring the fluid from the working chamber 60 into a fluid reservoir 26 via a fluid discharge line 92. The fluid discharge line 92 can, for example, be formed by two bores 102, 104 in the housing 24, running at right angles to each other.

A fluid supply line, which contains a valve 112, such as a solenoid valve, leads from the fluid reservoir 26 back to the working chamber 60. If the valve 112 is open, fluid can flow from the fluid reservoir 26 into the working chamber 60, so as to bring the viscous coupling into engagement. If the valve 112 is closed, the working chamber 60 empties, and the viscous coupling becomes inactive. The valve 112 is actuated by an actuator 114, for example, an electromagnet.

In the example of embodiment shown, the fluid reservoir 26 is part of the rotor 22, that is to say, it is arranged between a disc-shaped rotor body 30 and a cover 88. However, the fluid reservoir 26 can also be arranged in the housing 24, such that it can move relative to the rotor 22, or it can be arranged outside the housing 24.

Figure 4:
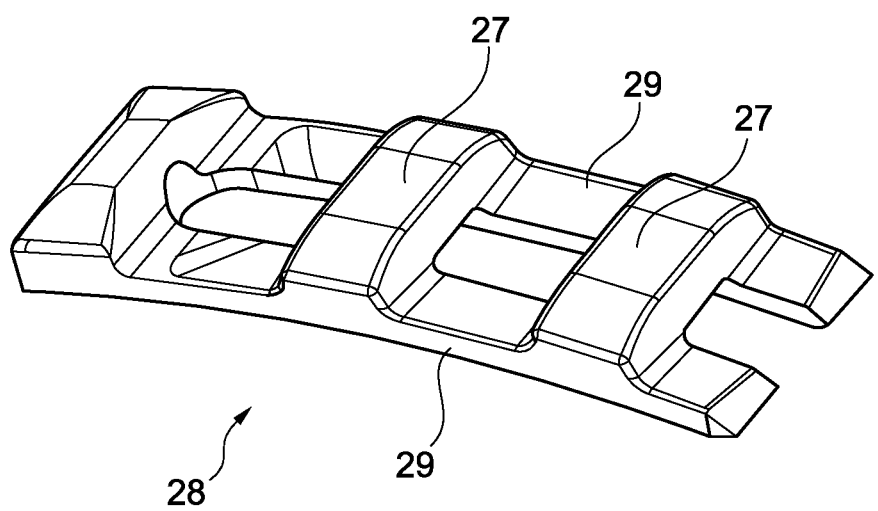
FIG. 4 shows an isometric view of a wiper of the viscous coupling.
Figure 5:
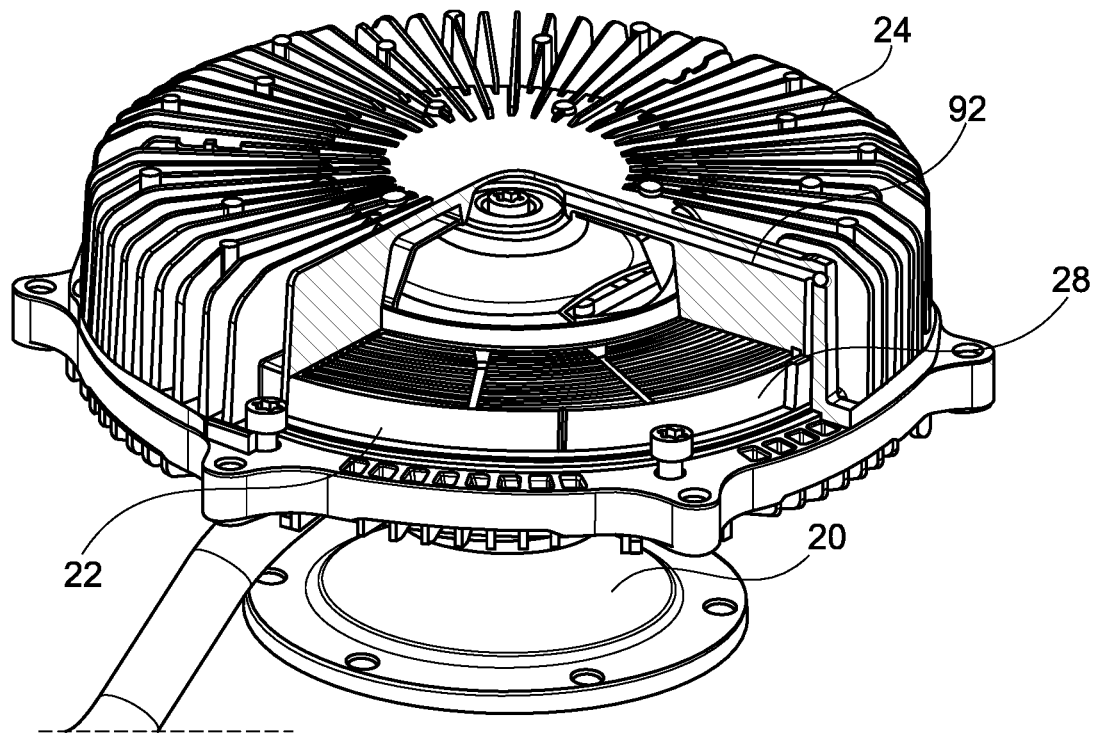
FIG. 5 shows schematically the viscous coupling in a partially sectioned view.
Figure 6:
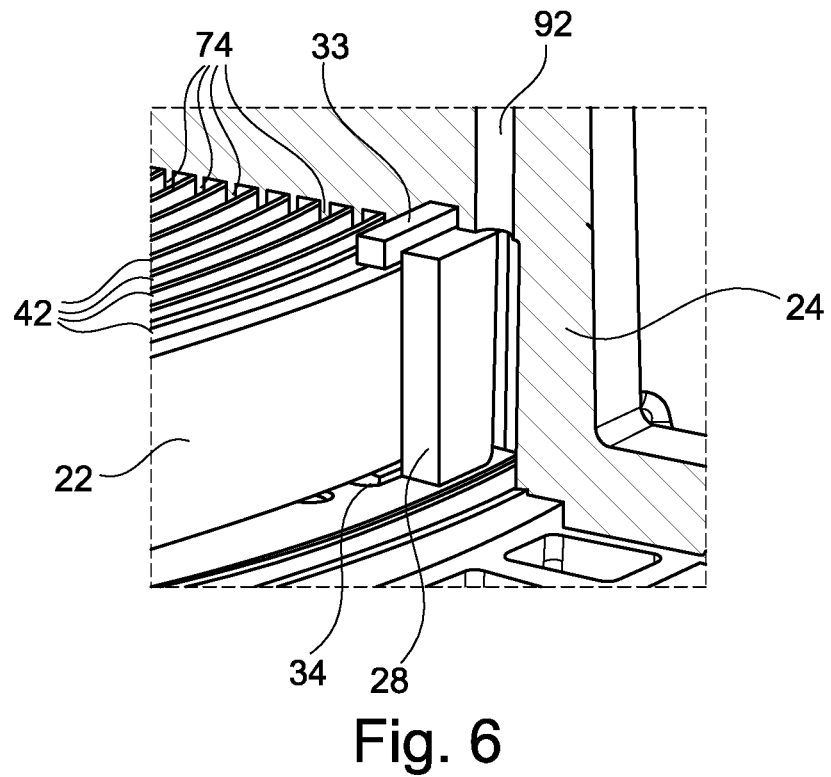
FIG. 6 shows schematically a detail of FIG. 5.

In order to transfer fluid from the working chamber 60 into the fluid discharge line 92, a wiper 28 is arranged in a floating manner in a chamber at the inlet 100 of the fluid discharge line 92, between the rotor 22 and the housing 24. In operation, the wiper 28 scrapes fluid off the rotor 22, so that this scraped-off fluid flows into the fluid discharge line 92 as dictated by centrifugal force, and passes from there into the fluid reservoir 26. The wiper 28 shown in FIG. 4 has two arms 29 extending in the circumferential direction of the rotor 22, which are connected by at least one transverse web 27. Between the two arms 29, a flow path extends under the transverse webs 27, through which fluid can be guided to the inlet 100 of the fluid discharge line 92.

In operation, the wiper 28 drags along the rotor 22, so that wear, that is to say, abrasion of material, occurs on both the wiper 28 and the rotor 22. This is not problematical and is largely negligible in the case of the comparatively massive rotor 22, but over time can lead to the wiper 28 no longer fulfilling its function and—in the case of conventional viscous couplings—it can even fracture.

In the viscous coupling illustrated, a stop 33, 34 is therefore attached to the housing 24 on both sides of the rotor 22.

These two stops 33, 34 can protrude outwards beyond the rotor 22 in the radial direction, so that the wiper 28 can bear against the stops 33, 34 with opposing edges. However, such a configuration leads to a gap occurring between the rotor 22 and the wiper 28, through which fluid can flow, so that the efficiency of the wiper 28 is reduced.

In the example of embodiment illustrated, the stops 33, 34 therefore do not (yet) protrude radially outwards beyond the rotor 22 in the case of a brand-new viscous coupling, and, in the case of a brand-new wiper 28, do not yet act upon its edge regions projecting in the axial direction above the rotor. Only when a relevant amount of material has been removed by abrasion from the inner face of the wiper 28 due to wear, does the stop 33, 34 come into play and prevents contact between the wiper 28 and the rotor 22. On the one hand, a loss of efficiency of the wiper 28 therefore only occurs when the viscous coupling has already been in use for a long time; on the other hand, a loss of efficiency of the wiper 28 can be avoided due to the late coming into effect of the stop 33, 34; a failure due to wear of the wiper 28, and thus of the viscous coupling, can reliably be prevented, even in the event of exceptionally intensive use.

The extent to which the stop or stops 33, 34 on a brand-new viscous coupling are displaced in the radial direction with respect to the rotor 22 can be freely chosen within wide limits. In general, it is beneficial if the rotor 22 of a brand-new viscous coupling does not project more than 0.5 mm beyond the stop or stops 33, 34 in the radial direction, for example, by 0.4 mm or less.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

10 Viscous coupling 60 Working chamber
14 Axial flow fan 70 Housing part
20 Shaft 72 Housing part
22 Rotor 74 Ribs
24 Housing 86 Ribs
26 Fluid reservoir 88 Cover
27 Transverse web 92 Fluid discharge line
28 Wiper 100 Inlet of the fluid discharge line
29 Arm 102 Bore
30 Rotor body 104 Bore
33 Stop 112 Valve
34 Stop 114 Actuator
42 Ribs
54 Ribs A Central axis
58 Bearing

What is claimed is:

1. A viscous coupling, comprising:
   a housing carrying a plurality of first ribs arranged concentrically about a central axis;
   a rotor that can rotate relative to the housing about the central axis in a predetermined direction of rotation, the rotor carrying a plurality of second ribs, wherein the first ribs and second ribs are arranged in a working chamber surrounded by the housing;
   a fluid reservoir;
   a fluid discharge line leading from the working chamber to the fluid reservoir;
   a wiper arranged between the housing and the rotor and configured for scraping fluid from the rotor and feeding it to the fluid discharge line, the wiper being moveable relative to the housing and the rotor in a radial direction; and
   at least one stop for the wiper arranged next to the rotor wherein the at least one stop limits inward movement of the wiper in the radial direction.

2. The viscous coupling according to claim 1, wherein the at least one stop is set back inwards in the radial direction relative to the rotor, so that an annular groove runs next to the rotor.

3. The viscous coupling according to claim 1, wherein the at least one stop comprises two stops and the rotor is arranged between the two stops, against which the wiper can bear with opposing edge sections, at least after abrasion of material due to wear has occurred between the edge sections of the wiper.

4. The viscous coupling according to claim 1, wherein the wiper comprises a floating arrangement at an inlet opening of the fluid discharge line.

5. The viscous coupling according to claim 1, wherein the wiper has two arms extending in the circumferential direction of the rotor, the two arms being connected by at least one transverse web.

6. The viscous coupling according to claim 1, further comprising a fluid supply line leading from the fluid reservoir to the working chamber.

7. The viscous coupling according to claim 6, further comprising a valve arranged in the fluid supply line.

8. The viscous coupling according to claim 1, wherein the wiper, at least after the occurrence of a permissible wear, bears against the rotor when scraping fluid from the rotor.

9. The viscous coupling according to claim 1, wherein the at least one stop is connected to the housing such that the at least one stop cannot rotate relative to the housing.

10. The viscous coupling according to claim 1, wherein the wiper projects in an axial direction beyond the rotor.

11. The viscous coupling according to claim 10, wherein the wiper projects in an axial direction on both sides beyond the rotor.

12. The viscous coupling according to claim 1, wherein the at least one stop is not engageable with the wiper when the wiper and rotor are in a brand-new condition and the at least one stop is engageable with the wiper after material has been removed from the wiper and the rotor by abrasion.

\* \* \* \* \*